United States Patent [19]

Jan

[11] Patent Number: 5,606,305
[45] Date of Patent: Feb. 25, 1997

[54] ULTRA-SONIC DOG-EXPELLING DEVICE

[76] Inventor: Te C. Jan, 24F-1 No. 161, Sung-Teh Rd., Taipei 110, Taiwan

[21] Appl. No.: 621,236

[22] Filed: Mar. 25, 1996

[51] Int. Cl.$^6$ .................................................. G08B 3/10
[52] U.S. Cl. ...................... 340/384.2; 340/573; 455/90; 455/128; 367/139
[58] Field of Search .................... 340/384.2, 384.7, 340/391.1, 573, 539, 825.69, 825.72, 825.44; 367/137, 138, 139; 119/719; 455/90, 128, 347–349; 361/748; D14/155, 191

[56] References Cited

U.S. PATENT DOCUMENTS

| | | | |
|---|---|---|---|
| D. 255,882 | 7/1980 | Kim | D14/155 |
| D. 268,783 | 4/1983 | Henshaw | D14/155 |
| 4,091,383 | 5/1978 | Rainville | 340/384.2 |
| 4,689,776 | 8/1987 | Thorndyke et al. | 367/139 |
| 4,972,508 | 11/1990 | King | 455/90 |
| 5,214,411 | 5/1993 | Herbruck | 340/573 |
| 5,386,084 | 1/1995 | Risko | 455/90 |
| 5,475,368 | 12/1995 | Collins | 340/391.1 |

FOREIGN PATENT DOCUMENTS 3618785  12/1987  Germany ............................ 340/384.2

*Primary Examiner*—Brent A. Swarthout
*Attorney, Agent, or Firm*—W. Wayne Liauh

[57] ABSTRACT

An ultra-sonic dog-expelling device, which comprises an upper casing, a lower casing and an ultra-sonic oscillation circuit; the tuner walls of the upper and lower casings are furnished with click grooves and fastening tongues respectively so as to have the two casings assembled together quickly. The inner side of each casing is furnished with a screw hole so as to facilitate the casings to be assembled into a closed case. By means of an intermittent unstable multi-oscillator, an intermittent oscillation frequency can be provided, and can be convened into an ultra-sonic wave through an ultra-sonic wave transducer located in the round hole at the front portion of the two casings to annoy and interfere the hearing sense of a dog so as to expel the dog away and to prevent it from attacking or nearing a person.

1 Claim, 5 Drawing Sheets

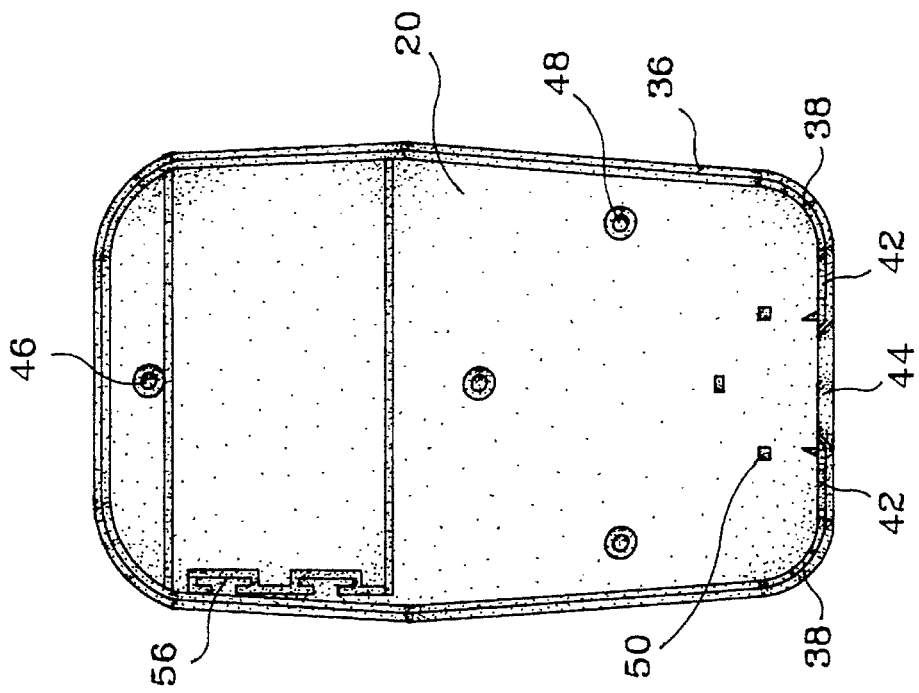
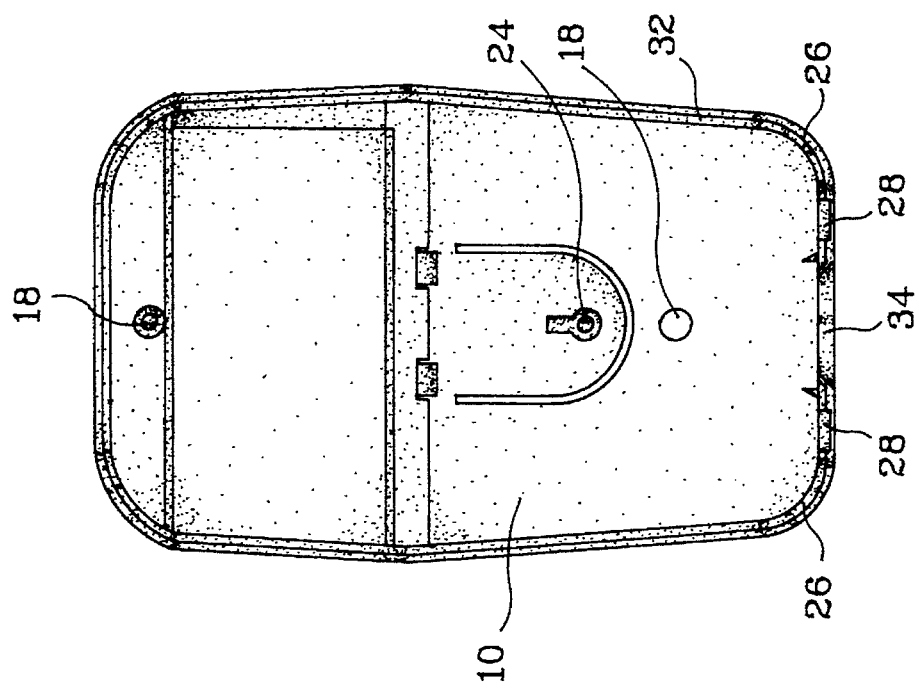

ULTRA-SONIC DOG-EXPELLING DEVICE

BACKGROUND OF THE INVENTION

1. Field of the Invention

This invention relates to an ultra-sonic dog-expelling device, and particularly to a device which is portable, and which can generate an intermittent oscillation frequency to interfere and annoy the hearing sense of a dog to be expelled.

2. Description of the Prior Art

Recently, there are a lot of cur dogs loitering in many streets, and a lot of private-fed fierce dogs which are causing a passer-by, visitors, a postman or a deliveryman fear to be bitten by them. Therefore, the safety of the aforesaid persons may be protected by carrying such ultra-sonic dog-expelling device so as to prevent from being attacked by a cur dog. During the highly developed scientific era, it has been proved that the high frequency of ultra-sonic wave can effectively expel a dog without any environmental pollution, and such dog-expelling device has widely been interested by people.

However, the conventional ultra-sonic dog-expelling device comprises a circuit to generate a continuous ultra-sonic wave, which is subject to causing a dog to adjust itself to such continuous sound, i.e., the dog-expelling effect can be reduced considerably after a period of time; further, to generate a continuous ultra-sonic wave usually consumes a lot of electric power, and therefore the battery thereof must be replaced quite often. Moreover, the current dog-expelling device usually has a complicate structure which causes inconvenience when a user replaces the battery thereof. In addition, the big size of the device causes inconvenience for a user to carry such a device or simply put it in a pocket.

SUMMARY OF THE INVENTION

The prime object of the present invention is to provide a dog-expelling device, which is an improved device to the conventional dog-expelling device; the present invention comprises an unstable multi-oscillator for generating an intermittent ultra-sonic wave to interfere and annoy a dog to be expelled; beside the more enhanced effect in dog repelling, the present invention is of the feature of consuming less electric power.

Another object of the present invention is to provide a dog-expelling device to improve the conventional device of the kind, such as the structure and size thereof. The upper and lower casings can be assembled and disassembled quickly by means of click grooved, fastening tongues, flanges and indented edges thereof. The upper casing has a battery lid to facilitate the battery replacing without opening the casings. The size of the casings is similar to a person's palm to facilitate fastening to the belt or putting in the pocket of a user.

BRIEF DESCRIPTION OF THE DRAWINGS

FIG. 3 is an inner plan view of the upper body portion of the present invention.

FIG. 4 is an inner plan view of the lower body portion of the present invention.

DETAILED DESCRIPTION

Figure 1:
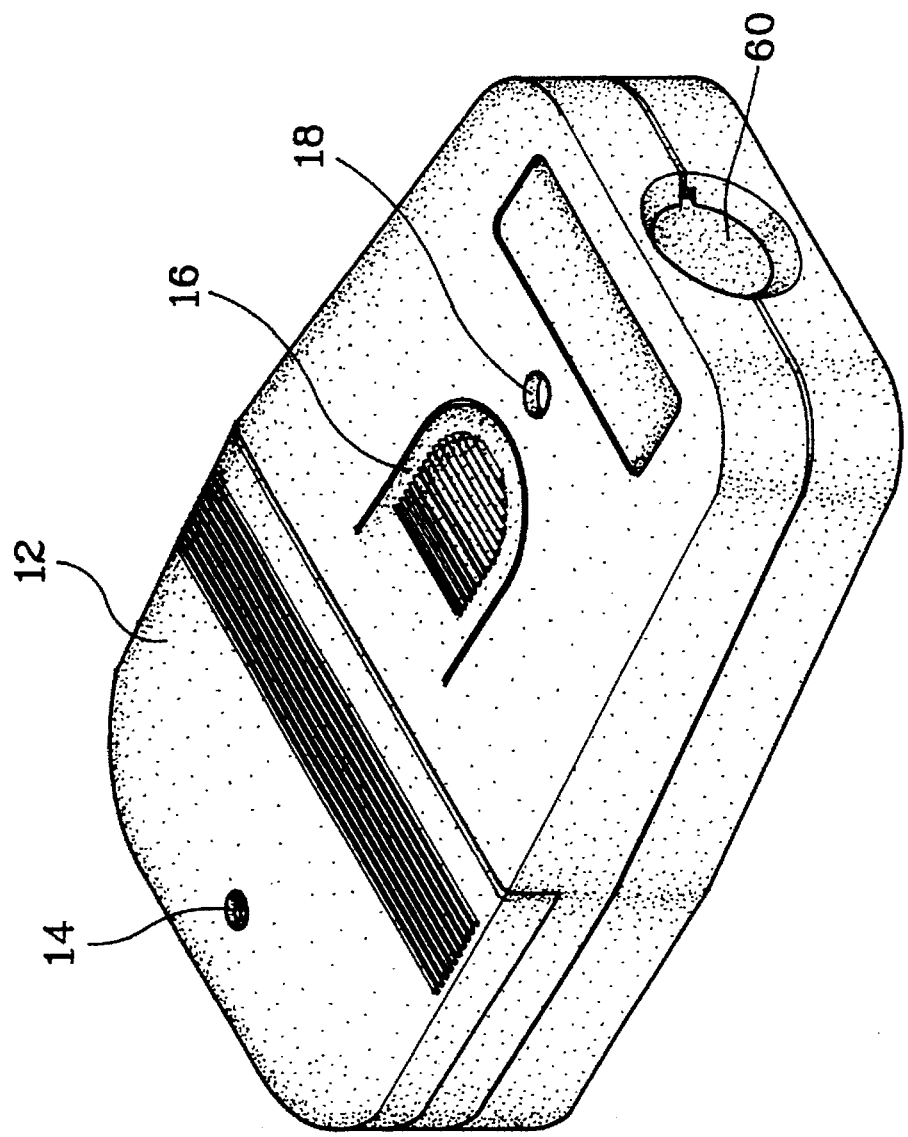
FIG. 1 is a perspective view of an embodiment according to the present invention.
Figure 2:
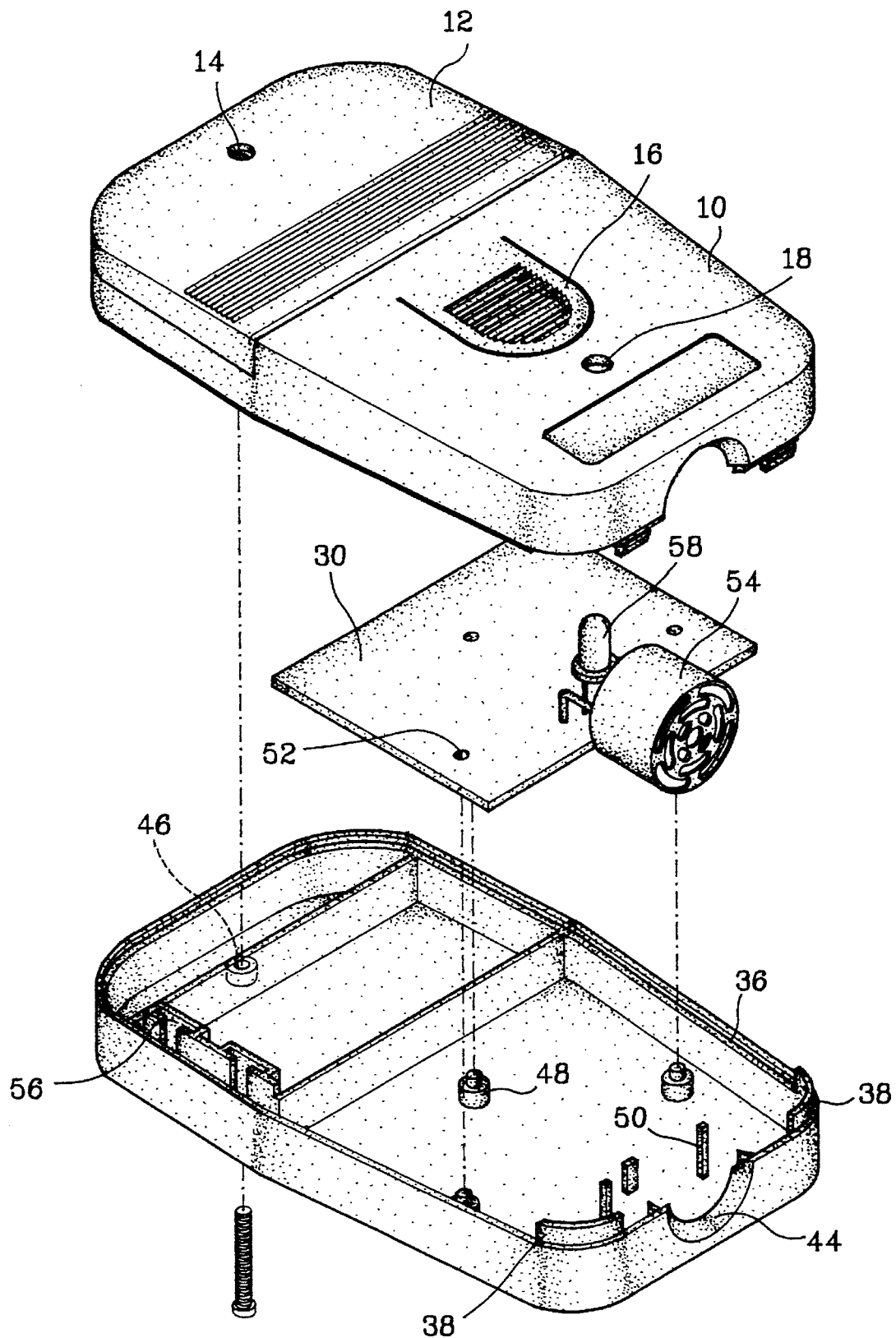
FIG. 2 is a disassembled view of the embodiment according to the present invention.
Figure 5:
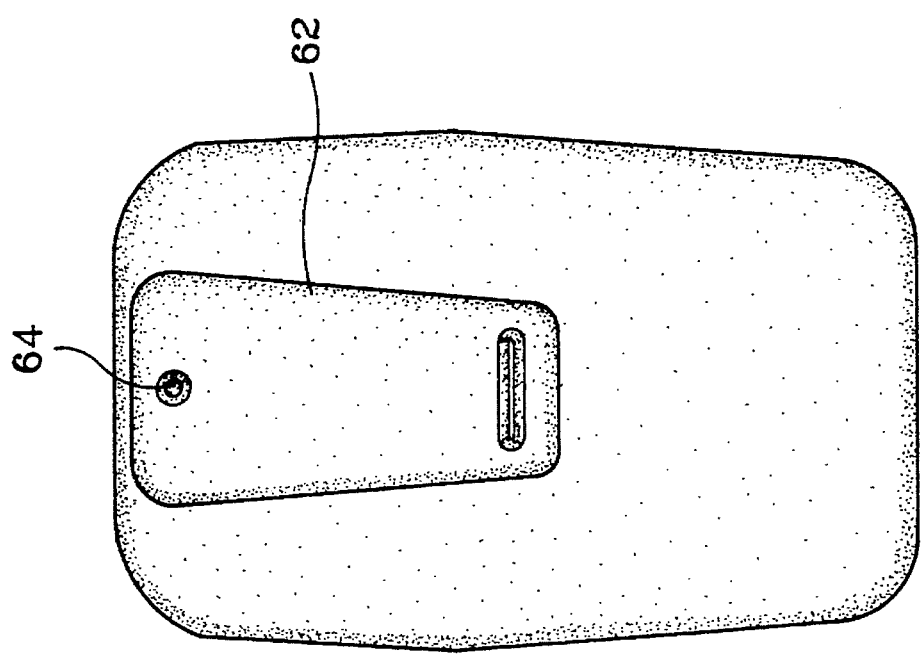
FIG. 5 is an outer plan view of the lower body portion of the present invention.

The features and functions of the present invention are described with the accompanying drawings as follows:

Referring to FIGS. 1 and 2, the present invention is illustrated with a perspective view and a disassembled view respectively; the embodiment according to the present invention comprises an upper casing 10, a lower casing 20, and an ultrasonic oscillation circuit board 30; the upper casing 10 has a rectangular battery lid 12 on the left side thereof and a screw hole 14 for receiving a screw. The right side of the upper casing 10 is formed into a staircase portion with a semi-oblong-shaped push spot 16, of which the right side has a small round through hole 18. The inside of the upper casing 10 is a hollow space (as shown in FIG. 3), which has a stud 24 under the push spot 16; the inner wall edge of the upper casing has two symmetrical click grooves 26, and two symmetrical fastening tongues 28. Between the two fastening tongues 28, there is a semi-circular arch 34; the inner wall of the upper casing 10 has a flange 32. The left side of the lower casing 20 is formed into rectangular shape so as to receive a battery exactly; the left side is also furnished with two battery conductors 56; the right side of the lower casing 20 also has a staircase portion; the inner wall of the lower casing has an indented edge 36, and the inner wall edge thereof has two fastening tongues 38 and two click grooves 42 corresponding to the click grooves 26 and the fastening tongues 28 on the upper casing 10 (as shown in FIG. 4). The wall between the two click grooves is formed into a semi-circular arch 44 corresponding to that of the upper casing to form into a round opening (as shown in FIG. 1). The lower casing also has a screw hole 46 and three round studs 48, which are used for mounting the ultra-sonic oscillation circuit board 30 with three round holes 52 respectively. The lower casing is also furnished with three studs 50 for positioning an ultra-sonic wave transducer 54 in place. The bottom side of the lower casing 20 is provided with a clip 62 has a screw hole 64 aligned with the small round hole 18 in the upper casing 10 and the screw hole 46 in the lower casing 20. The ultra-sonic wave transducer 54 and a LED 58 on the circuit board 30 are mounted in the round opening 60 formed with the semi-circular arches 34 and 44, and in the small round hole 18 of the upper casing 10 respectively.

The upper casing 10 and the lower casing 20 are assembled together by means of the click grooves 26 and 42, the fastening tongues 28 and 38, the flange 32 and the indented edge 36, i.e., the upper casing 10 and the lower casing 20 can be fastened together to form a closed case, and also can be disassembled quickly, if necessary.

Figure 6:
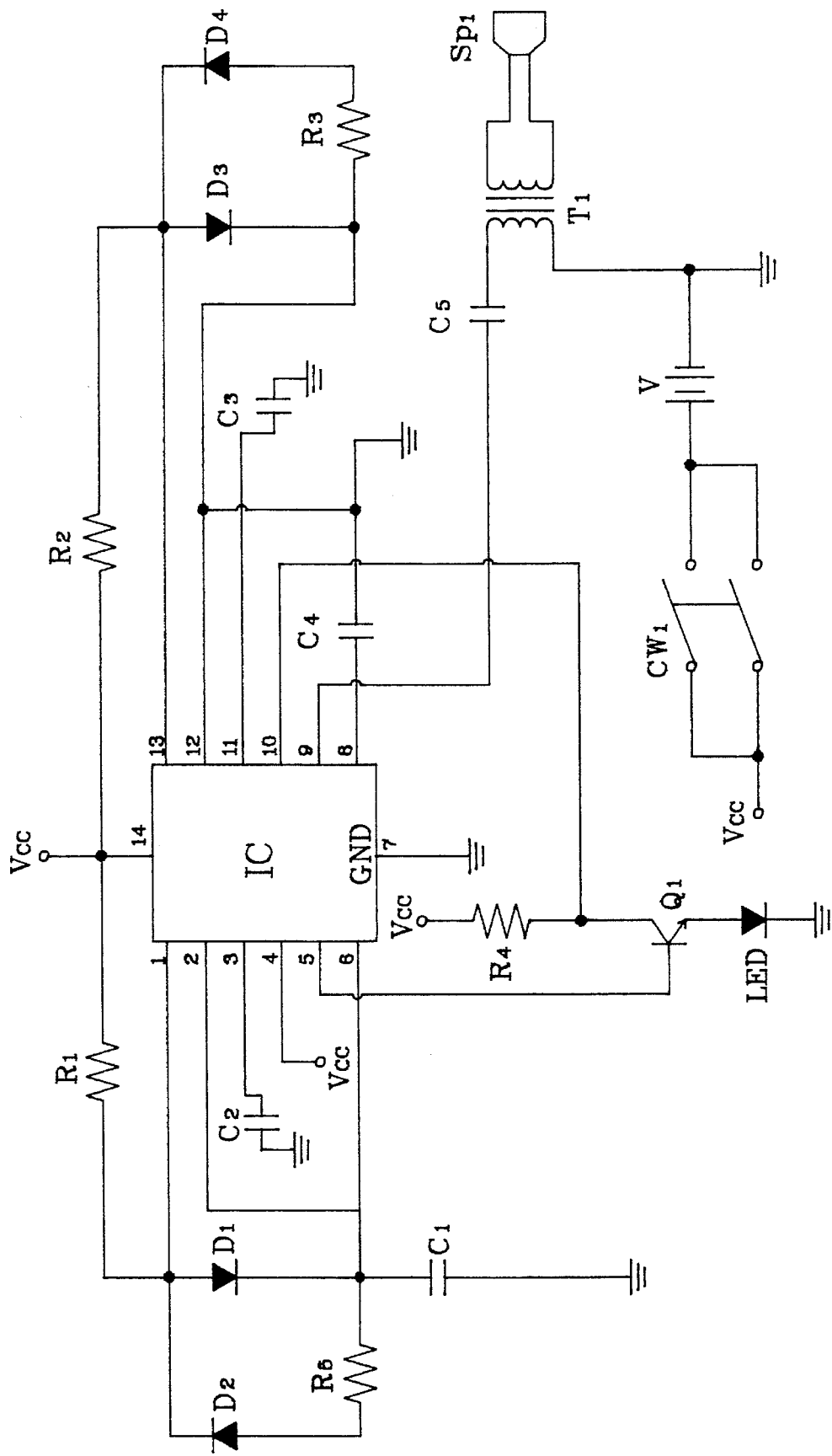
FIG. 6 is a circuit diagram of the ultrasonic wave transducer in the embodiment of the present invention.

FIG. 6 illustrates an ultra-sonic oscillation circuit according to the present invention. The circuitry comprises intermittent unstable multi-oscillator circuit which includes a timing IC (such as NE 556 timer), resistors $R_1$, $R_2$, $R_3$, $R_4$ and $R_5$, capacitors $C_1$, $C_2$, $C_3$ and $C_4$, a transistor Q1, a LED, a transformer T and an ultra-sonic wave transducer $SP_1$ 54. Referring to the left half part of FIG. 6, when the power supply Vcc is turned on, as the voltage of capacitor $C_1$ is 0 V, the output of the pin is Vcc, a current will flow through resistor $R_1$, the diode $D_1$ to charge capacitor $C_1$. As soon as the capacitor $C_1$ is charged to a given triggering level, the IC circuit will be triggered via pin 2. The output on pin 9 will be converted into a mechanical energy. The electric charge in capacitor $C_1$ will flow through diode $D_2$, resistor $R_5$ and be discharged via pin 1 of the IC until the voltage in $C_1$ being reduced to a given triggering level, and then the voltage on pin 9 will be restored to Vcc. Referring to the right half portion of FIG. 6, when the power supply Vcc is turned on, the voltage in capacitor $C_3$ is 0 V; then, a current will flow through resistor $R_2$ and diode $D_3$ to charge the capacitor $C_3$. As soon as the capacitor $C_3$ is charged to a given triggering level, through the trigger of pin 12 of the IC; the output of pin 9 will be converted into a mechanical energy, and the electric charge in $C_3$ will flow through diode $D_4$, resistor $R_3$ and be discharged via pin 13 until the voltage in $C_3$ being reduced to a given triggering level; the output voltage on pin 9 will be restored to Vcc; such repeatedly charging and discharging will form an oscillation circuit.

The pin 5 of the IC is connected with a transistor $Q_1$ and a resistor $R_4$, whereby a driving circuit is formed to drive the LED for indicating the operation of the circuit. The pin 9 of the IC is a current output terminal, while the capacitor $C_5$ is a DC (direct current) filter. Through a transformer $T_1$, the electric energy will be converted into a mechanical energy to drive the ultrasonic wave transducer $SP_1$ to generate an ultrasonic wave at a given frequency.

The aforesaid description is deemed a preferred embodiment of the present invention, but not as a limit to the present invention; any change and modification thereto will be deemed within the scope of claims thereof.

I claim:

1. An ultrasonic dog-expelling device to generate an intermittent oscillation frequency to annoy a dog's hearing sense to make it impatient, comprises:

an upper casing including two half portions, of which one having a rectangular battery lid and a screw hole; other half portion thereof formed into a stair case portion, top of said half portion having a push spot, and a small round through hole; inner surface thereof having a screw hole and a stud under said push spot; inner wall thereof having a flange, and inner wall edge thereof having two click grooves and two fastening tongues; a semi-circular arch furnished between said two fastening tongues;

a lower casing including two half portions, of which one being a rectangular member, while other half portion thereof formed into a staircase portion; inner wall thereof having an indented edge; inner wall edge thereof having two click grooves and two fastening tongues corresponding to said click grooves and said fastening tongues on said upper casing; a semi-circular arch furnished between said click grooves to be opposite to said semi-circular arch on said upper casing so as to form into a round opening; inner top surface of said lower casing having a screw hole, three round studs and three studs; outer bottom surface of said lower casing having a clip and a screw hole;

an ultra-sonic oscillation circuit board comprises an unstable multi-oscillator which having two triggering units be able to charge and to discharge repeatedly so as to become an oscillation circuit, and having a capacitor to filter D.C. (direct current) and a transformer for converting resistance into an intermittent ultra-sonic-wave oscillation frequency, and having an amplification transistor to drive a LED for indicating working condition of the said circuit; said circuit board having three round holes;

said upper casing and said lower casing formed into a closed case; and said intermittent oscillation circuit able to generate an intermittent frequency to stimulate and annoy hearing sense of a dog to obtain the effect of repelling the dog.

* * * * *